United States Patent [19]

Montano

[11] Patent Number: 4,947,426
[45] Date of Patent: Aug. 7, 1990

[54] TELEPHONE PROTECTION CIRCUIT

[75] Inventor: Frederick D. Montano, Chatswood, Australia

[73] Assignee: Standard Telephone and Cables Pty, Ltd., Alexandria, Australia

[21] Appl. No.: 294,554

[22] PCT Filed: Apr. 13, 1987

[86] PCT No.: PCT/AU87/00097
§ 371 Date: Oct. 19, 1988
§ 102(e) Date: Oct. 19, 1988

[87] PCT Pub. No.: WO87/06787
PCT Pub. Date: Nov. 5, 1987

[30] Foreign Application Priority Data

Apr. 30, 1986 [AU] Australia .................. PH 5681

[51] Int. Cl.$^5$ .............................. H04M 1/74
[52] U.S. Cl. ....................... 379/412; 379/387
[58] Field of Search ............ 301/119, 91, 56; 379/412, 387, 231, 234

[56] References Cited

U.S. PATENT DOCUMENTS

| | | |
|---|---|---|
| 2,960,328 | 11/1960 | Tate. |
| 4,079,211 | 3/1978 | Janssen ............... 379/412 X |
| 4,297,875 | 11/1981 | Kuhnle et al. . |
| 4,408,248 | 10/1983 | Bulley et al. ............ 361/91 |
| 4,794,640 | 12/1988 | Yeh ..................... 379/388 |
| 4,809,322 | 2/1989 | Riesmeyer ............. 379/380 |
| 4,815,126 | 3/1989 | Goode et al. .......... 379/359 |

FOREIGN PATENT DOCUMENTS

| | | |
|---|---|---|
| 0153011 | 7/1952 | Australia . |
| 0153012 | 7/1952 | Australia . |
| 0533161 | 11/1982 | Australia . |
| 1956183 | 5/1984 | Australia . |
| 0109977 | 6/1984 | European Pat. Off. . |
| 8603584 | 6/1986 | World Int. Prop. O. . |

Primary Examiner—Jin F. Ng
Assistant Examiner—Randall S. Vaas
Attorney, Agent, or Firm—Christie, Parker & Hale

[57] ABSTRACT

A protection device is provided for a telephone having a two wire subscriber line and an earth line. The protection device comprises a single surge protection device connected between a bridge rectifier polarity guard and the remainder of the telephone circuitry, which is connected to the output of the polarity guard. Three diodes are used to interconnect the earth line and the pair of output lines from the polarity guard to the surge protection device in such a way as to prevent surges from being fed to the remainder of the telephone circuitry. The surge paths including one or two arms of the polarity guard.

8 Claims, 1 Drawing Sheet

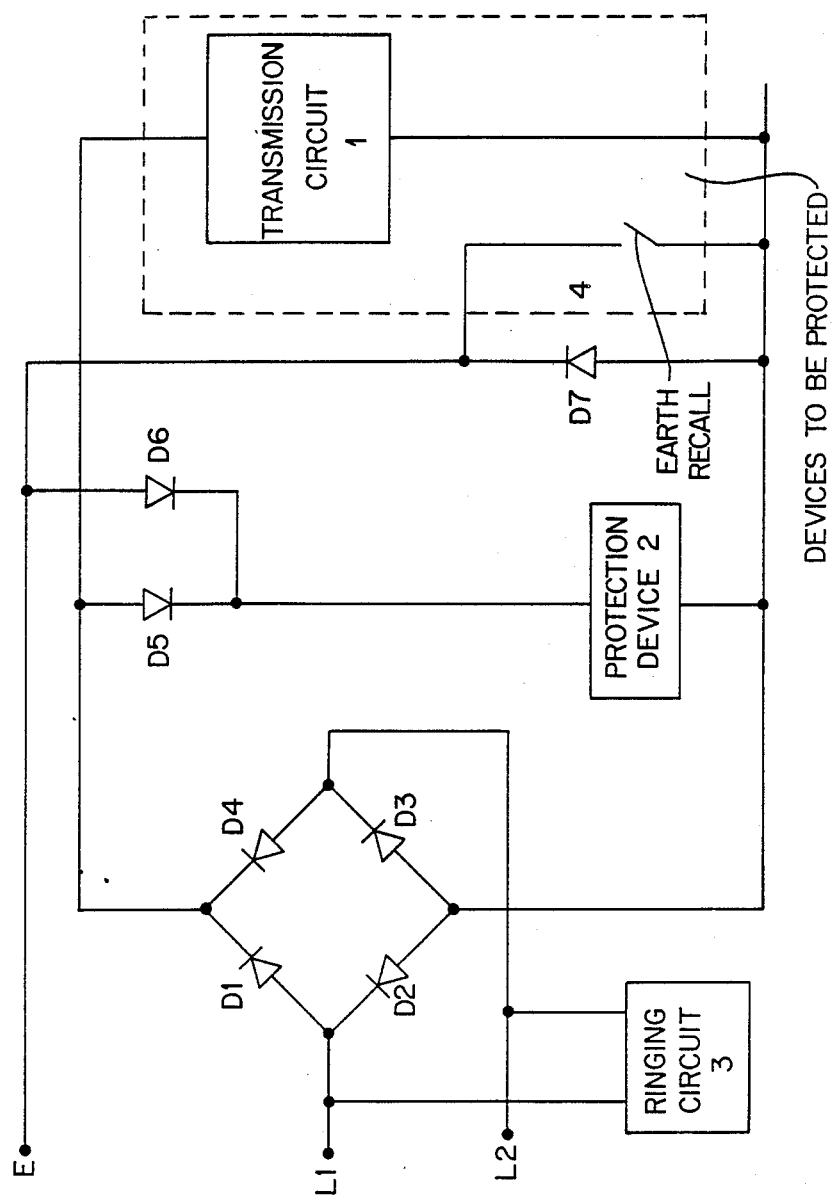

TELEPHONE PROTECTION CIRCUIT

TECHNICAL FIELD

The invention relates to an electronic protection circuit for a telephone subset.

BACKGROUND ART

Subsets are now utilizing integrated circuits which are not as robust in regard to line surges as many conventional components, though surge protection has been applied to the conventional subsets. Because of the layout of the various components of a subset and the possibility of transverse or longitudinal faults it has been found that two or three protection devices have been required to protect the various subset blocks, e.g. the ringing circuit and the rectifier bridge and the rest of the subset circuitry. In subsets which have an earth line, e.g. phones connected to PMBX's or some PABX's or in some Telecom administrations where it is necessary to make an earth contact to seize a line, there is also a requirement to have protection on the earth line. Some administrations require all subsets to be adapted to be used with either earth recall or timed loop break.

Surges which may occur include transverse lightning surges of 2 kv between the wires of the subscriber line, or longitudinal surges of 5 kv between the line and the earth. Other faults, include mains cross, spikes generated by signalling and induced currents.

Normally protection devices are provided between L1 and E, L2 and E and between L1 and L2.

DISCLOSURE OF THE INVENTION

This specification discloses the use of a single protection device connected by diodes to steer the surges from the various line configurations through the protective device. The diodes need to have a rapid response time and a high surge rating. An acceptable rating has been found to be 30 A for 8 ms. Diodes capable of this are cheap and readily available, offering considerable saving over the cost of the protective devices.

This specification discloses a protection circuit for a telephone having an earth wire and a subscriber line comprising first and second wires, wherein there is a polarity guard, a pair of input terminals connected to the subscriber line and a pair of output terminals connected to the telephone transmission and reception circuit, wherein, in parallel with the telephone circuit there is a protection device in series with a first diode, the first diode being forward biased with respect to the polarity of the polarity guard output, the earth wire is connected to the junction of the protective device and the first diode by a second diode connected to pass surges of a first polarity between the earth wire and the output of the polarity guard the second diode and the protection device being shunted by a third diode, connected to pass surges between the earth wire and the polarity guard output of the opposite polarity from those surges passed by the second diode, the latter surge path including the first diode.

BRIEF DESCRIPTION OF THE DRAWINGS

The invention will be described with reference to the drawing, in which:

FIG. 1 shows the layout of a circuit embodying the protection systems.

BEST MODE OF CARRYING OUT THE INVENTION

In FIG. 1 the subscriber line wires connect to terminals L1 and L2 which feed into a polarity guard comprising bridge rectifier D1, D2, D3, D4. The output of the bridge is connected to the subset circuit 1 in parallel with protective device 2 which is in series with diode D5. The earth line E is connected to the protective device 2 by diode D6 and, for surges of the opposite polarity by diode D7.

The operation of this protection circuit is described below.

For a transverse surge between L1 and L2 the bridge ensures that the surge is of the correct polarity to pass through the protective device. The path of the surge is via D5 which is poled to be forward biased with reference to the bridge output. The protective device 2 may for instance be a metal oxide varistor (MOV), one or more power zener diodes, or thyristor clamps, which appear as an open circuit at normal operating voltages and exhibit a breakdown characteristic at a specified overvoltage.

For a surge between L1 and E the path may be E, D6, 2, D2, L1. If the polarity is opposite the path would be E, D7, 2, D5, D1.

Similarly where the surge is between L2 and E the paths are, E, D6, 2, D3, L2; or for reverse polarity E, D7, 2, D5, D4.

D5 serves the purposes of preventing the surge being fed from E through D6 to D1/D4, (across the subset) and bypassing the protective device.

The ringing circuit 3, which in modern phones may also be electronic, is also protected from the surge. The protective device clamps the voltage which appears across the output of the bridge by drawing a heavy current.

In phones fitted with an earth recall facility, the button 4 is connected in parallel with diode D7. This may be a mechanical or electronic switch.

INDUSTRIAL APPLICABILITY

The invention allows the substitution of diodes for much more expensive protection devices in the manufacture of telephone subsets and other equipment to be connected to phone lines.

The claims defining the invention are as follows:

1. A protection circuit for telephone equipment including a transmission circuit connected to a telephone line having an earth wire and a subscriber line comprising first and second wires, the protection circuit comprising a polarity guard having a pair of input terminals connected to the subscriber line and a pair of output terminals connected to the transmission circuit, a first diode forward biased with respect to a first said output terminal, a protection device in parallel with the transmission circuit and in series with the first diode, a second diode connecting the earth wire to a first terminal of the protection device adjacent the first diode to pass, via a first surge path which includes the protection device but which does not include the first diode, surges of a first polarity between the earth wire and the polarity guard, and a third diode connecting the earth wire to a second terminal of the protection device remote from the first diode to pass, via a second surge path between the earth wire and the polarity guard which includes both the protection device and the first diode, surges of the opposite polarity from those surges passed by the second diode.

2. A protection circuit as claimed in claim 1, in which the equipment comprises the transmission and reception circuits of a telephone.

3. A protection circuit as claimed in claim 1, wherein the protection device comprises a device which exhibits substantially open circuit characteristics up to a breakdown voltage, at which it clamps the voltage.

4. A protection circuit as claimed in claim 1, in which the protection device comprises either a metal oxide varistor, or one or more zener diodes, or a thyristor clamping circuit.

5. A protection circuit as claimed in claim 1, wherein the polarity guard is a diode bridge rectifier.

6. A protection circuit as claimed in claim 5 wherein the bridge rectifier comprises fourth, fifth, sixth and seventh diodes, in which the cathodes of the fourth and seventh diodes are connected to the positive terminal of the bridge rectifier output and the anodes of the fifth and sixth diodes are connected to the negative terminal of the bridge rectifier output, the first wire of the subscriber line being connected to the anode of the fourth diode and the cathode of the fifth diode, the second wire of the subscriber line being connected to the anode of the seventh diode and the cathode of the sixth diode, the anode of the first diode being connected to the positive terminal of the bridge rectifier, the cathode of the second diode being connected to the cathode of the first diode and the cathode of the third diode being connected to the anode of the second diode, whereby: surges of a first polarity between the first wire and the earth wire follow a path from the first wire through the fourth diode, the first diode, the protection device, and the third diode to the earth wire; surges of a second polarity between the first wire and the earth wire follow a path from the earth wire through the second diode, the protection device, and the fifth diode to the first wire; and surges of a first polarity between the second wire and the earth wire follow a path from the second wire through the seventh diode, the fist diode, the protection device and the third diode to the earth wire; and surges of a second polarity between the earth wire and the second wire follow a path from the earth wire through the second diode, the protection device and the sixth diode to the second wire.

7. A telephone subset including a protection circuit as claimed in claim 1.

8. A telephone subset comprising a protection circuit for equipment connected to a telephone line having an earth wire and a subscriber line comprising first and second wires, the protection set further comprising a polarity guard having a pair of input terminals connected to the subscriber line and a pair of output terminals connected to the transmission circuit, a first diode forward biased with respect to a first said output terminal, a protection device in parallel with the transmission circuit and in series with the first diode, a second diode connecting the earth wire to a first terminal of the protection device adjacent the first diode to pass, via a first surge path which includes the protection device but which does not include the first diode, surges of a first polarity between the earth wire and the polarity guard, and a third diode connecting the earth wire to a second terminal of the protection device remote from the first diode to pass, via a second surge path between the earth wire and the polarity guard which includes both the protection device and the first diode, surges of the opposite polarity from those surges passed by the second diode, and an earth recall switch in parallel with the third diode.

* * * * *